R. POWERS.
LIQUID LEVEL INDICATOR.
APPLICATION FILED AUG. 22, 1916.
1,224,786.
Patented May 1, 1917.
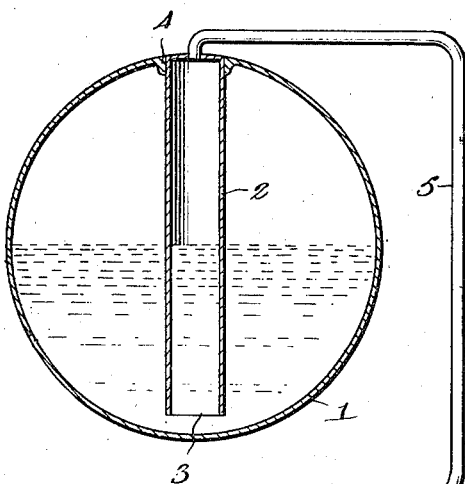
Fig.1.
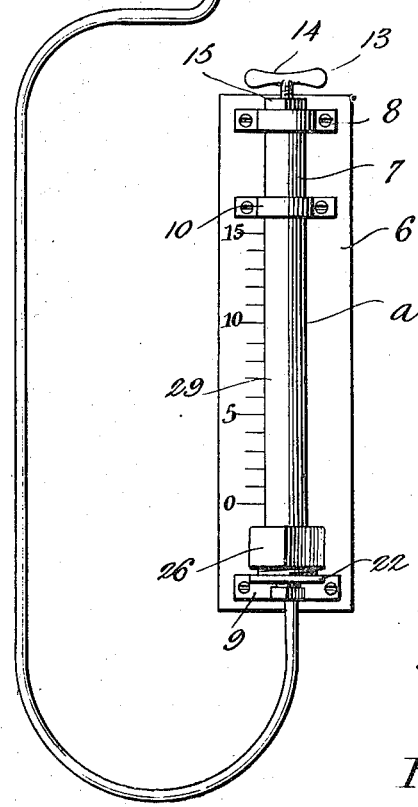
Fig.2.
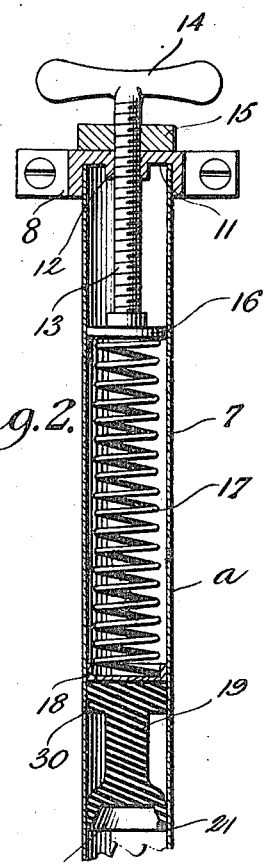
Fig.3.
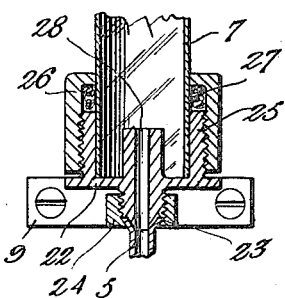
Inventor
Richard Powers.
By Victor J. Evans
Attorney
Witnesses
Frederick W. Ely
P. M. Smith

UNITED STATES PATENT OFFICE.

RICHARD POWERS, OF PITTSBURGH, PENNSYLVANIA.

LIQUID-LEVEL INDICATOR.

1,224,786.  Specification of Letters Patent.  Patented May 1, 1917.

Application filed August 22, 1916. Serial No. 116,344.

*To all whom it may concern:*

Be it known that I, RICHARD POWERS, a citizen of the United States, residing at Pittsburgh, in the county of Allegheny and State of Pennsylvania, have invented new and useful Improvements in Liquid-Level Indicators, of which the following is a specification.

This invention relates to liquid level indicators or gages, the same being especially designed for use in connection with the gasolene tanks of motor vehicles, and the object in view being to provide an indicator or gage in which the indicator proper may be located at any desired distance from the gasolene tank irrespective of the location of the latter, the gage operating under air pressure and the pressure being transmitted through a tube from an air space in the gasolene tank to an air tube forming a member of the gage or indicator.

Another object of the invention is to provide means whereby the gage may be adjusted to suit different cars and in accordance with the location and capacity of the gasolene tank.

With the above and other objects in view, the invention consists in the novel construction, combination and arrangement, herein fully described, illustrated and claimed.

Figure 1 is a general view partly in elevation and partly in section showing the complete apparatus of this invention.

Fig. 2 is an enlarged vertical sectional view of the indicator.

Fig. 3 is an enlarged vertical section through the bottom bracket and the parts intimately associated therewith.

Referring to the drawing, 1 designates a gasolene tank which may be located at any point in a motor vehicle or craft. In carrying out the present invention, an air pressure tube 2 is arranged within the tank 1 extending vertically and centrally therein and having its lower end open at 3 to admit the liquid to the tube so that it may stand at the same level as the rest of the liquid. The upper end of the tube 2 is connected by an air tight joint at 4 to the top of the tank through which it extends and said tube has in communication therewith one extremity of an air tube or pipe 5 which leads to the indicator designated generally at *a* and which may be located on the dash or instrument board or other convenient part of the vehicle.

The indicator comprises a base-board 6 and the latter has mounted thereon a glass tube 7 which is supported by a top bracket 8 and a bottom bracket 9. One or more additional straps 10 may be employed for fastening the tube 7 to the board 6. The top bracket 8 is formed with a socket 11 to receive the upper end of the glass tube 7 and is also formed with a threaded opening 12 to receive the threaded shank 13 of a spring tensioning screw 14, said screw being held fixed when adjusted by means of a lock nut 15. At its lower end the shank 13 carries a head 16 which bears against the upper extremity by a coiled expansion spring 17 the lower end of which is received in a cup 18 attached to and carrying a plunger 19.

The indicating plunger 19 is preferably composed of rubber or other flexible resilient material and the lower end of said plunger is made in the form of a cup 20, the rim 21 of which is made of decreasing thickness toward its edge so that air pressure under the plunger 19 and within the tube 7 will act to spread the flange 21 and maintain an air tight contact between the plunger and the inside wall of the glass 7.

The bottom bracket 9 which is fastened to the board 6 is provided with a substantially horizontal shelf 22 having on its under side a downwardly projecting nipple 23 threaded to receive a union nut 24 by means of which the flanged adjacent extremity of the pipe 5 is fastened to said nipple. The shelf 22 is also provided with an upwardly extending annular flange 25 exteriorly threaded to be engaged by an internally threaded packing nut 26 containing a packing space 27 in which any suitable packing material may be placed. The flange 25 forms a holder for the lower end of the glass tube 7 while the packing material surrounding said tube prevents leakage of air.

The shelf 22 is further provided centrally thereof with an upstanding tubular seat 28 the bore of which is in communication with the bore of the nipple 23. The bottom end of the plunger 19 rests against the seat 28 when said plunger is in its lowermost position. The board 6 is graduated or provided with an indicating scale 29 and the plunger 19 is formed with a cylindrical portion or flange 30 which is used in conjunction with said scale to visually indicate the level of liquid in the tank 1. By loosening the lock nut 15 and turning the adjusting screw 14, any desired tension may be placed upon the spring 17 so as to resist the movements of the plunger 19 under the action of the air which is compressed in the tube 2 of the liquid tank. As the liquid rises in the tank 1, air is compressed in the tube 2 and transmitted through the pipe 5 to the glass tube 7 thereby elevating the indicating plunger 19 and causing the same to traverse the graduated scale 29. As the liquid level falls in the tank 1, the air pressure is relieved, permitting the plunger 19 to move downwardly and traverse the indicating scale in the reverse direction.

I claim:

1. A liquid level indicating device comprising a support, a glass tube mounted upon said support and having its upper end sealed, means connecting said tube to the support embodying a bracket, an expansible indicating plunger movable longitudinally within said glass tube, a spring for resisting the movement of said plunger in one direction and instrumental in moving said plunger in the reverse direction, and tensioning means for said spring, said bracket comprising a shelf having an upstanding tubular seat for said plunger, an annular flange within which the lower end of the glass tube is received, and a packing nut embracing said tubular flange and glass tube and having a threaded engagement with said tubular flange.

2. A liquid level indicating device comprising a support, a glass tube mounted upon said support and having its upper end sealed, means connecting said tube to the support embodying a bracket, an expansible indicating plunger movable longitudinally within said glass tube, and embodying a resilient annular flange adapted to be held by liquid pressure in close contact with the tube, a spring for resisting the movement of said plunger in one direction and instrumental in moving said plunger in the reverse direction, and tensioning means for said spring, said bracket comprising a shelf having an upstanding tubular seat for said plunger embraced by the resilient plunger flange at the initial end of its movement, an annular flange within which the lower end of the glass tube is received, and a packing nut embracing said tubular flange and glass tube and having a threaded engagement with said tubular flange.

In testimony whereof I affix my signature.

RICHARD POWERS.

Copies of this patent may be obtained for five cents each, by addressing the "Commissioner of Patents, Washington, D. C."